(12) United States Patent
Gross et al.

(10) Patent No.: US 6,776,278 B1
(45) Date of Patent: Aug. 17, 2004

(54) EGG TRANSFER APPARATUS WITH CONVERGING GUIDES THAT FACILITATE EVEN DISTRIBUTION OF EGGS ON A MOVING CONVEYOR

(75) Inventors: Edward W. Gross, Raleigh, NC (US); Sean M. Bryan, Raleigh, NC (US); Phillip N. Strayer, Apex, NC (US)

(73) Assignee: Embrex, Inc., Durham, NC (US)

( * ) Notice: Subject to any disclaimer, the term of this patent is extended or adjusted under 35 U.S.C. 154(b) by 0 days.

(21) Appl. No.: 10/408,907

(22) Filed: Apr. 8, 2003

(51) Int. Cl.[7] ............................................. B65G 47/24
(52) U.S. Cl. ...................... 198/416; 198/445; 198/446; 198/836.1; 198/836.3
(58) Field of Search ................................. 198/443, 445, 198/446, 436, 453, 382, 383, 384, 836.1, 836.3

(56) References Cited

U.S. PATENT DOCUMENTS

| | | | | |
|---|---|---|---|---|
| 3,238,694 A | * | 3/1966 | Bartlett et al. ................. 53/58 |
| 3,428,161 A | * | 2/1969 | Niederer ..................... 198/445 |
| 3,592,327 A | * | 7/1971 | Koch et al. ................. 198/400 |
| 3,623,591 A | * | 11/1971 | Koch et al. ................. 198/432 |
| 3,741,368 A | * | 6/1973 | Burkholder ............. 198/418.1 |
| 3,910,233 A | | 10/1975 | Amburn ......................... 119/1 |
| 3,964,233 A | | 6/1976 | Thomas ......................... 53/26 |
| 4,042,100 A | * | 8/1977 | Morrone ..................... 198/446 |
| 4,078,652 A | * | 3/1978 | MacFarland et al. ....... 198/443 |
| 4,366,896 A | * | 1/1983 | Tomosue ..................... 198/384 |
| 4,382,501 A | * | 5/1983 | Niederer et al. ............ 198/384 |
| 4,458,630 A | | 7/1984 | Sharma et al. ................. 119/1 |
| 4,901,861 A | | 2/1990 | Cicchelli ..................... 209/539 |
| 4,932,514 A | * | 6/1990 | Doppenberg ................ 198/445 |
| 5,028,421 A | | 7/1991 | Fredericksen et al. ..... 424/85.2 |
| 5,908,117 A | | 6/1999 | Stroman et al. ............ 209/639 |
| 5,918,726 A | * | 7/1999 | Temmink ................. 198/418.6 |
| 5,937,995 A | * | 8/1999 | Hartness et al. ............ 196/445 |
| 6,000,526 A | * | 12/1999 | van Veldhuisen et al. .. 196/446 |
| 6,244,214 B1 | | 6/2001 | Hebrank ...................... 119/6.8 |

* cited by examiner

*Primary Examiner*—Richard Ridley
(74) *Attorney, Agent, or Firm*—Myers Bigel Sibley & Sajovec

(57) ABSTRACT

An egg transfer apparatus is configured to distribute eggs substantially evenly with reduced breakage on a moving conveyor. The egg transfer apparatus includes a conveyor having opposite first and second ends and a plurality of elongated, flexible guides extending between the conveyor first and second ends in adjacent, spaced apart relationship with each other. The guides define a plurality of channels that are configured to evenly distribute eggs placed on the conveyor. The guides are elevated above the conveyor by an amount that decreases in a direction towards the conveyor second end. In addition, the guides converge toward the conveyor second end.

21 Claims, 3 Drawing Sheets

EGG TRANSFER APPARATUS WITH CONVERGING GUIDES THAT FACILITATE EVEN DISTRIBUTION OF EGGS ON A MOVING CONVEYOR

FIELD OF THE INVENTION

The present invention relates generally to eggs and, more particularly, to methods and apparatus for handling eggs.

BACKGROUND OF THE INVENTION

In poultry hatcheries and other egg processing facilities, eggs are handled and processed in large numbers. The term "processing" includes treating live eggs with medications, nutrients, hormones and/or other beneficial substances while the embryos are still in the egg (i.e., in ovo). In ovo injections of various substances into avian eggs have been employed to decrease post-hatch morbidity and mortality rates, increase the potential growth rates or eventual size of the resulting bird, and even to influence the gender determination of the embryo. Injection of vaccines into live eggs have been effectively employed to immunize birds in ovo. It is further desirable in the poultry industry to manipulate an embryo in ovo to introduce foreign nucleic acid molecules (i.e., to create a transgenic bird) or to introduce foreign cells (i.e., to create a chimeric bird) into the developing embryo.

In ovo injection of a virus may be utilized to propagate the particular virus for use in preparation of vaccines. Examples of substances that have been used for, or proposed for, in ovo injection include vaccines, antibiotics and vitamins. Examples of in ovo treatment substances and methods of in ovo injection, as well as apparatus for handling a plurality of eggs, are described in U.S. Pat. No. 4,458,630 to Sharma et al. and U.S. Pat. No. 5,028,421 to Fredericksen et al., which are incorporated herein by reference in their entireties.

Improved methods of injecting eggs containing an embryo may be used to remove samples from eggs, including embryonic and extra-embryonic materials. Further, for other applications it may be desirable to insert a sensing device inside an egg containing an embryo to collect information therefrom, for example, as described in U.S. Pat. No. 6,244,214 to Hebrank, which is incorporated herein by reference in its entirety.

In commercial hatcheries, eggs typically are held in setting flats during incubation. At a selected time, typically on the eighteenth day of incubation, the eggs are removed from an incubator. Unfit eggs (namely, dead eggs, rotted eggs, empties, and clear eggs) are identified and removed, live eggs are treated (e.g., inoculated) and then transferred to hatching baskets.

Conveyor belts are conventionally utilized to transport live eggs from one location to another before, during and/or after processing. Unfortunately, live eggs typically will not distribute evenly across a moving conveyor belt. Live eggs will often roll backwards, end-over-end, in the opposite direction of the moving conveyor belt. The lack of even distribution and backwards rolling of live eggs can cause difficulties at various processing apparatus. For example, eggs can become bunched together which may result in breakage. In addition, bunching can result in eggs being placed on top of other eggs on a conveyor, which may also cause breakage. Eggs rolling end-over-end can also "ride up" on other eggs which may also cause breakage.

SUMMARY OF THE INVENTION

In view of the above discussion, embodiments of the present invention provide an egg transfer apparatus that is configured to distribute eggs substantially evenly with reduced breakage on a moving conveyor. The egg transfer apparatus includes a conveyor having opposite first and second ends and a plurality of elongated, flexible guides extending between the conveyor first and second ends in adjacent, spaced apart relationship with each other. The guides, for example, may be strands of wire (e.g., metallic wire, polymeric wire, fibrous wire, etc.), elongated, thin rods, etc. The guides define a plurality of channels that are configured to evenly distribute eggs placed on the conveyor. The guides are elevated above the conveyor by an amount that decreases in a direction towards the conveyor second end. In addition, the guides converge toward the conveyor second end. This configuration of the guides allows an egg in a channel that is backed-up with eggs to cross over into an adjacent channel. Accordingly, eggs on the moving conveyor achieve a substantially even distribution.

An egg handling system according to embodiments of the present invention includes an egg positioning apparatus that positions eggs in a predetermined orientation, an egg transfer apparatus operably associated with the egg positioning apparatus, and an egg lifting device operably associated with the egg transfer apparatus. The conveyor of the egg transfer apparatus is operably associated with the egg positioning apparatus.

The egg positioning apparatus is configured to orient and hold eggs in a predetermined position for processing (e.g., in ovo injection, etc.) and includes a plurality of chutes for receiving eggs in single-file order from the conveyor of the egg transfer apparatus. Each of the channels of the egg transfer apparatus is in communication with a respective one of the chutes. The configuration of each channel allows an egg to cross over into an adjacent channel when a respective chute is backed up with eggs.

DETAILED DESCRIPTION OF THE INVENTION

Figure 1:
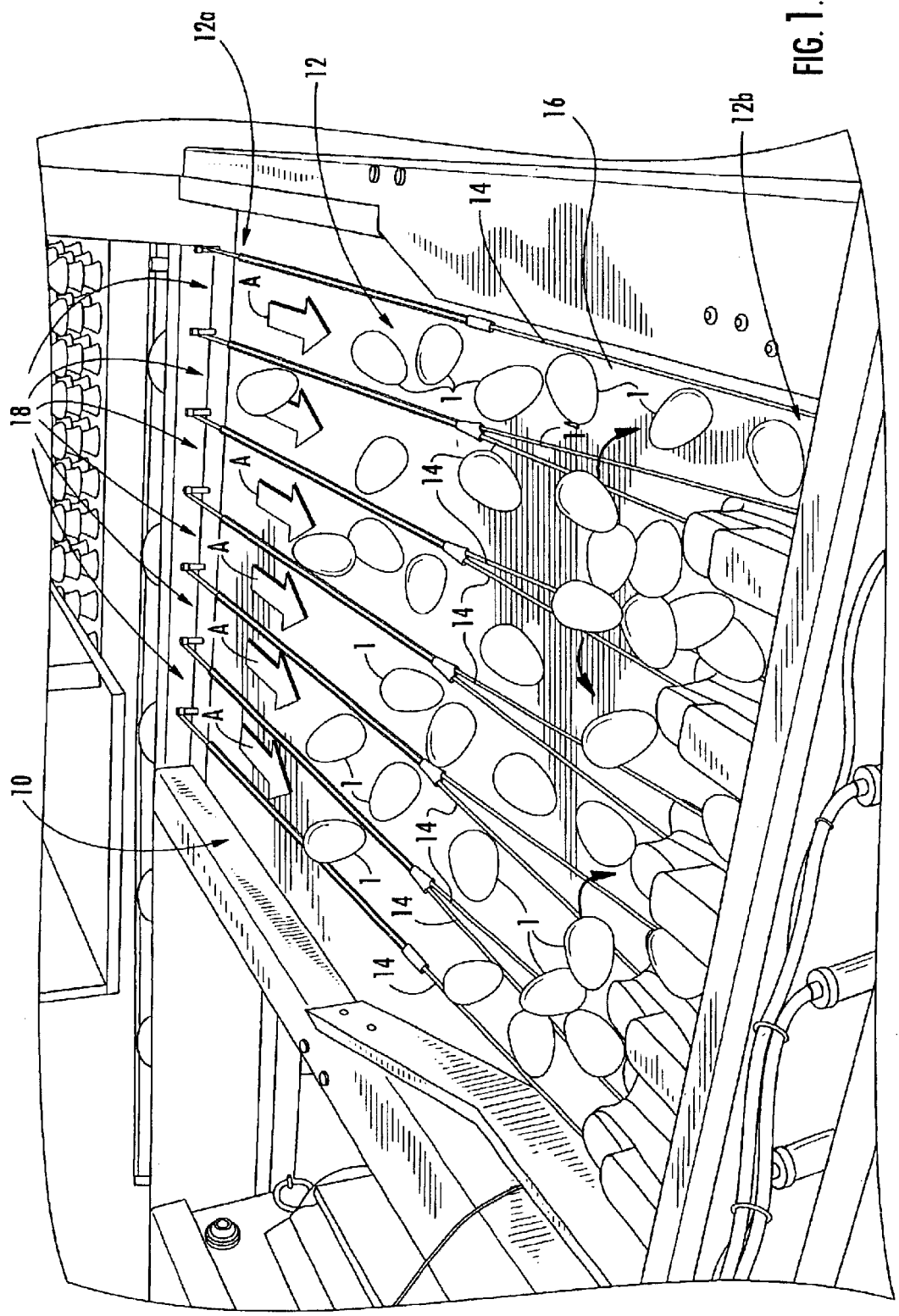
FIG. 1 is a perspective view of an egg transfer apparatus, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise.

All publications, patent applications, patents, and other references mentioned herein are incorporated by reference in their entirety.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

The present invention may be practiced with any type of avian egg, including, but not limited to, chicken, turkey, duck, goose, quail, and pheasant eggs.

Referring now to FIG. 1, an egg transfer apparatus 10 according to embodiments of the present invention is illustrated. The illustrated apparatus 10 includes a conveyor 12 that has opposite first and second ends 12a, 12b, and a plurality of elongated guides 14 extending between the conveyor first and second ends 12a, 12b in adjacent, spaced apart relationship with each other. The term "conveyor" is intended to include any type of system for conveying eggs. Embodiments of the present invention are not limited to a particular type of conveyor (e.g., single, belt-driven conveyors). Conveyors according to embodiments of the present invention may utilize various types of drives and various types of conveying means (e.g., conveying belts, conveying platforms, etc.).

The illustrated guides 14 are filaments, and may be metallic wire, polymeric, and/or fibrous filaments. For example, a filament may be a string, a polymeric filament, such as fishing line, etc. However, the guides 14 may be slender rods or other elongated objects with a small cross-sectional area. According to embodiments of the present invention, filament material is a flexible material. The illustrated conveyor 12 includes an endless belt 16 that is generally horizontal and configured to convey eggs 1 disposed thereon in the direction indicated by arrows A.

The guides 14 define a plurality of channels 18 that are configured to evenly distribute eggs placed on the conveyor belt 16, as will be described below. The guides 14 are elevated above the conveyor belt 16 by an amount that decreases in a direction towards the conveyor second end (i.e., along direction A) such that an egg 1 in a channel 18 can cross over one or more guides into adjacent channels 18. In the illustrated embodiment, the guides 14 converge towards the conveyor second end 12b such that each channel 18 has a first width $W_1$ (FIG. 3) at the conveyor first end 12a and a second width $W_2$ (FIG. 3) at the conveyor second end 12b that is smaller than the first width $W_1$. For chicken eggs, the width $W_1$ is typically between about 3 inches and about 5 inches, and the width $W_2$ is between about 2.5 inches and about 3.5 inches. However, other widths $W_1$, $W_2$ may be utilized for chicken eggs and for other types of eggs, as well. Embodiments of the present invention are not limited to these dimensions.

Figure 3:
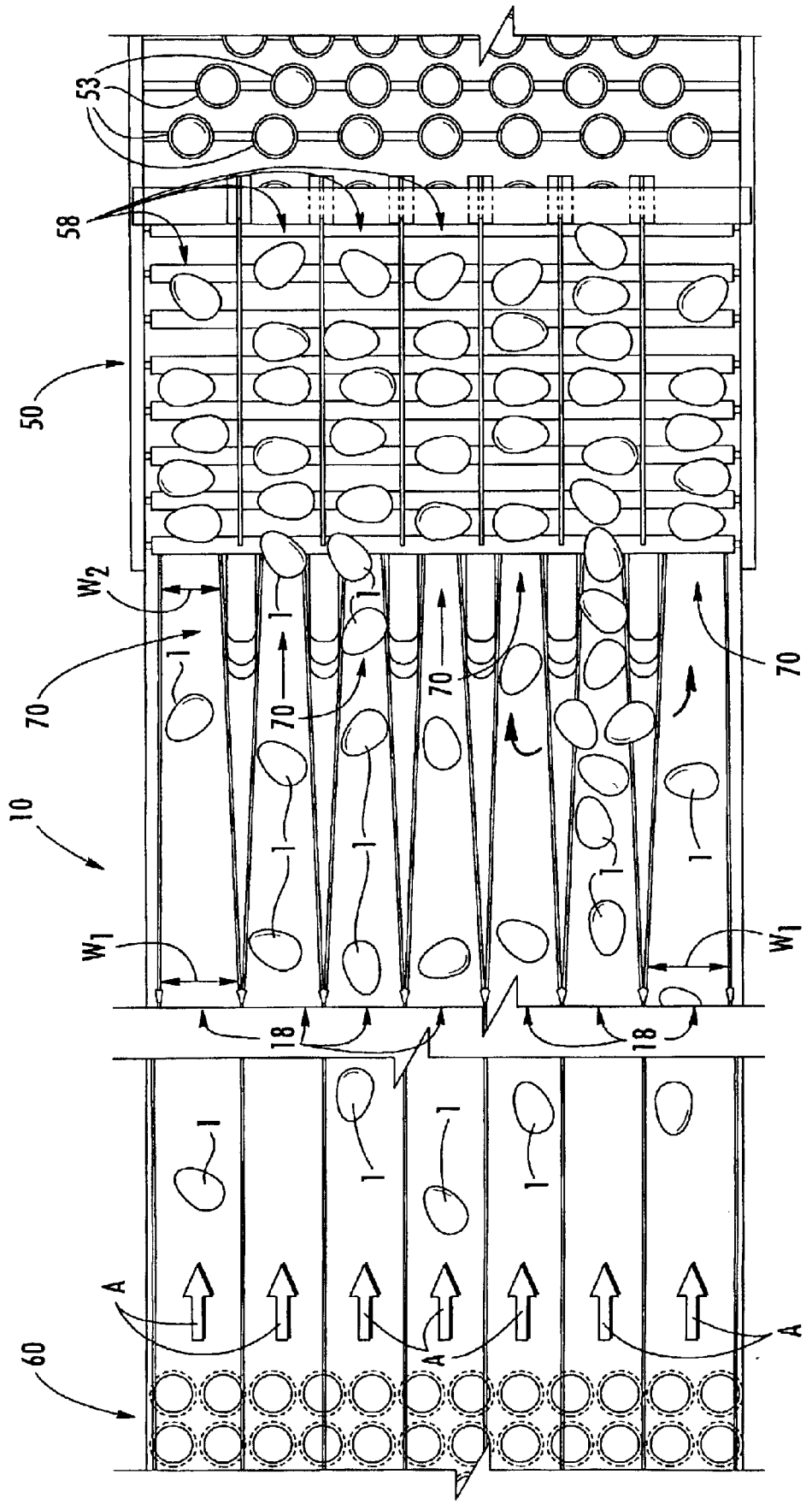
FIG. 3 is a top plan view of the egg handling system of FIG. 2, taken along lines 3—3.

According to embodiments of the present invention, the width between respective guides 14 forming a channel 18 are adjustable. Various ways of adjusting the width of respective guides 14 may be utilized. In FIG. 1, the width of respective guides 14 has been adjusted such that the respective guides forming each channel do not converge along the entire length of the conveyor 12. In FIG. 3, however, the width of respective guides 14 has been adjusted such that the respective guides forming each channel converge along the entire length of the conveyor 12.

The respective guides 14 forming a channel 18 are spaced apart near the conveyor second end 12b such that an egg 1 conveyed through the channel 18 via the conveyor 12 is in continuous contacting relationship with each of the guides 14 at the conveyor second end 12b. The illustrated configuration of the guides 14 allows an egg 1 in a channel 18 that is backed-up with eggs to cross over the guides into adjacent channels 18.

The guides 14 are elevated above the conveyor 12 by an amount that decreases in a direction towards the conveyor second end 12b. Thus, the elevation $E_1$ of respective guides 14 at the conveyor first end 12a is higher than the elevation $E_2$ of respective guides 14 at the conveyor second end 12b. For chicken eggs, the elevation $E_1$ of respective guides 14 forming a channel 18 is between about 0.75 inches and about 1.25 inches at the conveyor first end 12a, and the elevation $E_2$ at the conveyor second end 12b is between about 0.25 inches and about 0.5 inches. A slope of each guide 14 between the conveyor first and second ends may be between about 1.5 degrees and about 2.5 degrees. However, other elevations $E_1$, $E_2$ may be utilized for chicken eggs and for other types of eggs, as well. Embodiments of the present invention are not limited to these elevations.

According to embodiments of the present invention, the elevations of respective guides 14 forming a channel 18 are adjustable. Various ways of adjusting the elevation of respective guides 14 may be utilized, without limitation.

Figure 2:
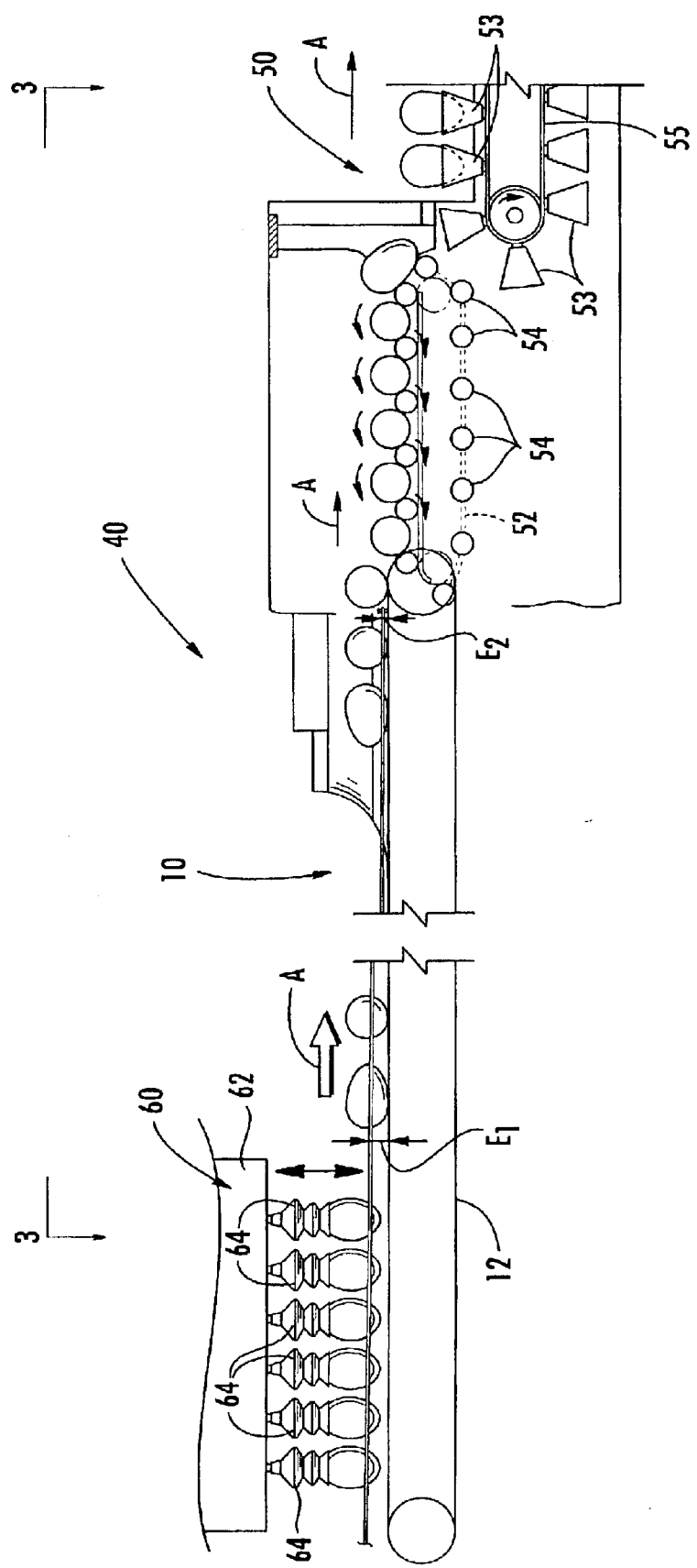
FIG. 2 is a side elevation view of an egg handling system, according to embodiments of the present invention.

Referring now to FIGS. 2–3, an egg handling system 40, according to embodiments of the present invention, is illustrated and includes an egg positioning apparatus 50 that positions eggs in a predetermined orientation, an egg transfer apparatus 10 operably associated with the egg positioning apparatus 50, and an egg lifting device 60 operably associated with the egg transfer apparatus 10. The conveyor 12 of the egg transfer apparatus 10 is operably associated with the egg positioning apparatus 50.

The egg positioning apparatus 50 is configured to orient and hold eggs in a predetermined position for processing (e.g., in ovo injection, etc.). The illustrated egg positioning apparatus 50 includes an endless conveyor 52 which has a plurality of parallel rollers 54 which are rotatably connected at their ends with a drive mechanism (e.g., chains, etc.). The rollers 54 move in the direction indicated by arrows $A_2$ while also rotating in the clockwise direction as viewed from FIG. 2. Under the effect of the movement and rotation of the rollers 54, eggs 1 travel along the direction indicated by arrow A (with their narrow ends generally perpendicular to the direction of travel indicated by arrow A) and are fed into respective channels 58 and then into respective receiving cups 53 with their narrow ends pointing downwards. The receiving cups 53 are mounted on an endless conveyor system 55 that moves the cups 53 in the direction indicated by arrow A. An exemplary egg positioning apparatus 50 for use in combination with an egg transfer apparatus, according to embodiments of the present invention, is described in U.S. Pat. No. 3,592,327, which is incorporated herein by reference in its entirety. Each receiving cup 53 transports a respective egg 1 to a processing station 40, such as an INOVOJECT® brand automated injection system.

Egg positioning apparatus according to embodiments of the present invention may have various configurations, and are not limited to the illustrated embodiments. Egg positioning apparatus may include different numbers of channels and may include receiving cups of varying sizes and/or configurations. Moreover, various types of rollers and conveyor systems may be utilized without limitation.

The illustrated egg positioning apparatus 50 includes a plurality of chutes 70 for receiving eggs in single-file order from the conveyor 12 of the egg transfer apparatus 10. Each of the channels 18 of the egg transfer apparatus 10 is in communication with a respective one of the chutes 70. The elevation $E_2$ of the guides 14 adjacent the conveyor second end 12b is such that eggs 1 conveyed by the conveyor 12 can move laterally (i.e., transverse to direction A) along the conveyor 12 between adjacent channels 18 so as to maintain a generally even distribution of eggs at the conveyor second end 12b.

The illustrated egg lifting device 60 is operably associated with the conveyor 12 of the egg and is configured to simultaneously lift a plurality of eggs 1 and place the plurality of eggs 1 on the conveyor 12 adjacent the conveyor first end 12a. The illustrated egg lifting device 60 includes a lifting head 62 that has an array of manifold blocks and vacuum cups 64. The lifting head 62 is configured to lift a plurality of eggs 1 and place the eggs on the conveyor 12. Various types of egg lifting apparatus may be utilized in accordance with embodiments of the present invention. The present invention is not limited to the illustrated egg lifting apparatus.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An egg transfer apparatus, comprising:
   an endless conveyor having opposite first and second ends, wherein the conveyor conveys eggs from the first end to the second end; and
   a plurality of elongated, flexible guides extending between the first and second ends of the conveyor in adjacent, spaced apart relationship with each other and with the conveyor to define a plurality of channels, wherein the guides are elevated above the conveyor by an amount that decreases in a direction towards the conveyor second end, wherein each channel has a first width at the first end of the conveyor and a second width at the second end of the conveyor that is smaller than the first width, and wherein the elevation of the guides adjacent the conveyor second end is such that eggs conveyed by the conveyor can move laterally along the conveyor between adjacent channels so as to facilitate a generally even distribution of eggs at the conveyor second end.

2. The apparatus of claim 1, wherein the guides of each respective channel converge toward the conveyor second end.

3. The apparatus of claim 1, wherein the width and elevation of respective guides forming a channel are adjustable.

4. The apparatus of claim 1, wherein the width of respective guides forming a channel is between about 3 inches and about 5 inches at the conveyor first end, and between about 2.5 inches and about 3.5 inches at the conveyor second end.

5. The apparatus of claim 1, wherein the elevation of each guide forming a channel is between about 0.75 inches and about 1.25 inches at the conveyor first end, and between about 0.25 inches and about 0.5 inches at the conveyor second end.

6. The apparatus of claim 1, wherein the guides comprise filaments.

7. The apparatus of claim 6, wherein the filaments comprise metallic wire.

8. The apparatus of claim 6, wherein the filaments comprise polymeric wire.

9. The apparatus of claim 6, wherein the filaments comprise string.

10. The apparatus of claim 1, wherein the conveyor comprises a variable speed conveyor.

11. An egg handling system, comprising:
    an egg positioning apparatus that positions eggs in a predetermined orientation, wherein the egg positioning apparatus comprises a plurality of receptacles for receiving the eggs and a plurality of chutes for directing eggs in single-file order to the receptacles; and
    an egg transfer apparatus operably associated with the egg positioning apparatus, the egg transfer apparatus comprising:
       an endless conveyor having opposite first and second ends that conveys eggs from the first end to the second end; and
       a plurality of elongated, flexible guides extending between the first and second ends of the conveyor in adjacent, spaced apart relationship with each other and with the conveyor to define a plurality of channels, wherein each channel is in communication with a respective one of the chutes, wherein the guides are elevated above the conveyor by an amount that decreases in a direction towards the conveyor second end, wherein each channel has a first width at the first end of the conveyor and a second width at the second end of the conveyor that is smaller than the first width, and wherein the elevation of the guides adjacent the conveyor second end is such that eggs conveyed by the conveyor can move laterally along the conveyor between adjacent channels so as to facilitate a generally even distribution of eggs at the conveyor second end.

12. The egg handling system of claim 11, wherein the guides of each respective channel converge toward the conveyor second end.

13. The egg handling system of claim 11, wherein the width and elevation of respective guides forming a channel are adjustable.

14. The egg handling system of claim 11, wherein the width of respective guides forming a channel is between about 3 inches and about 5 inches at the conveyor first end, and between about 2.5 inches and about 3.5 inches at the conveyor second end.

15. The egg handling system of claim 11, wherein the elevation of each guide forming a channel is between about 0.75 inches and about 1.25 inches at the conveyor first end, and between about 0.25 inches and about 0.5 inches at the conveyor second end.

16. The egg handling system of claim 11, further comprising an egg lifting device operably associated with the conveyor, wherein the egg lifting device simultaneously lifts a plurality of eggs and places the plurality of eggs on the conveyor adjacent the conveyor first end.

17. The egg handling system of claim 11, wherein the guides comprise filaments.

18. The egg handling system of claim 17, wherein the filaments comprise metallic wire.

19. The egg handling system of claim 17, wherein the filaments comprise polymeric wire.

20. The egg handling system of claim 17, wherein the filaments comprise string.

21. The egg handling system of claim 11, wherein the conveyor comprises a variable speed conveyor.

* * * * *